United States Patent
Watanabe

(10) Patent No.: US 9,821,783 B2
(45) Date of Patent: Nov. 21, 2017

(54) BRAKE CONTROL APPARATUS AND BRAKE CONTROL METHOD

(71) Applicant: HITACHI AUTOMOTIVE SYSTEMS, LTD., Hitachinaka-shi, Ibaraki (JP)

(72) Inventor: Asahi Watanabe, Kawasaki (JP)

(73) Assignee: HITACHI AUTOMOTIVE SYSTEMS, LTD., Hitachinaka-Shi (JP)

( * ) Notice: Subject to any disclaimer, the term of this patent is extended or adjusted under 35 U.S.C. 154(b) by 0 days.

(21) Appl. No.: 15/021,251

(22) PCT Filed: Sep. 11, 2014

(86) PCT No.: PCT/JP2014/074099
§ 371 (c)(1),
(2) Date: Mar. 10, 2016

(87) PCT Pub. No.: WO2015/041141
PCT Pub. Date: Mar. 26, 2015

(65) Prior Publication Data
US 2016/0221553 A1    Aug. 4, 2016

(30) Foreign Application Priority Data
Sep. 17, 2013    (JP) ................. 2013-191431

(51) Int. Cl.
| | |
|---|---|
| *B60T 8/34* | (2006.01) |
| *B60T 8/40* | (2006.01) |
| *B60T 7/04* | (2006.01) |
| *B60T 13/14* | (2006.01) |
| *B60T 13/66* | (2006.01) |
| *B60T 13/68* | (2006.01) |

(52) U.S. Cl.
CPC .......... *B60T 8/4081* (2013.01); *B60T 7/042* (2013.01); *B60T 13/146* (2013.01); *B60T 13/662* (2013.01); *B60T 13/686* (2013.01)

(58) Field of Classification Search
CPC ...... B60T 13/58; B60T 13/146; B60T 13/662; B60T 13/686; B60T 13/745; B60T 7/042; B60T 8/4081
USPC .......................... 303/10, 113.1–113.4, 114.1
See application file for complete search history.

(56) References Cited

U.S. PATENT DOCUMENTS

| | | | | |
|---|---|---|---|---|
| 6,464,307 | B1 * | 10/2002 | Yoshino | B60T 7/042 303/11 |
| 6,494,547 | B2 * | 12/2002 | Higashimura | B60T 8/00 188/156 |
| 7,325,884 | B2 * | 2/2008 | Ganzel | B60T 8/4081 303/113.1 |
| 7,770,982 | B2 * | 8/2010 | Gottwick | B60T 8/4081 303/11 |

(Continued)

FOREIGN PATENT DOCUMENTS

| | | |
|---|---|---|
| DE | 10159789 C1 | 4/2003 |
| JP | 2000-185645 A | 7/2000 |

(Continued)

*Primary Examiner* — Christopher Schwartz
(74) *Attorney, Agent, or Firm* — Foley & Lardner LLP

(57) ABSTRACT

To provide a brake control apparatus that brings a brake operating member to a proper position during antilock control.

At least during operation of an antilock controller 105, valves 23 and 24 are actuated to impart a stroke to a piston 52P with hydraulic pressure generated by the pump 7.

20 Claims, 4 Drawing Sheets

(56) References Cited

U.S. PATENT DOCUMENTS

| | | | | |
|---|---|---|---|---|
| 9,527,486 B2* | 12/2016 | Maruo | ................ | B60T 8/4081 |
| 2005/0151418 A1* | 7/2005 | Bickel | ................ | B60T 8/4081 |
| | | | | 303/122 |
| 2005/0162008 A1* | 7/2005 | Bickel | ................ | B60T 8/4081 |
| | | | | 303/113.4 |
| 2012/0283926 A1* | 11/2012 | Ito | ................ | B60T 8/4018 |
| | | | | 701/70 |

FOREIGN PATENT DOCUMENTS

| JP | 2005-511384 A | 4/2005 |
|---|---|---|
| JP | 2005-511385 A | 4/2005 |
| JP | 2006-117199 A | 5/2006 |
| JP | 2006-248473 A | 9/2006 |
| JP | 2010-089599 A | 4/2010 |

* cited by examiner

BRAKE CONTROL APPARATUS AND BRAKE CONTROL METHOD

TECHNICAL FIELD

The present invention relates to a brake control apparatus for an automobile.

BACKGROUND ART

Brake control apparatuses comprising a stroke simulator for generating reaction force in response to a driver's brake operation are known in the art. Patent Document 1, for example, discloses a brake control apparatus comprising an on-off valve between a stroke simulator and a master cylinder, the on-off valve being controlled to open and close during antilock control, so as to notify the driver of the ongoing antilock control.

CITATION LIST

Patent Document

Patent Document 1: JP-A-2010-89599

SUMMARY OF INVENTION

Technical Problem

Such a conventional brake control apparatus may not always bring the brake operating member to a proper position during antilock control. An object of the present invention is to provide a brake control apparatus that brings the brake operating member to a proper position during antilock control.

Solution to Problem

To achieve this object, the brake operating apparatus of the present invention preferably controls each valve during operation under antilock control and uses hydraulic pressure generated by a hydraulic pressure source to impart a stroke to a piston of a master cylinder Advantageous Effect of Invention This ensures that the brake operating member is brought to a proper position.

DESCRIPTION OF EMBODIMENTS

The embodiments of the brake control apparatus of the present invention will now be described with reference to the accompanying drawings.

Embodiment 1

Figure 1:
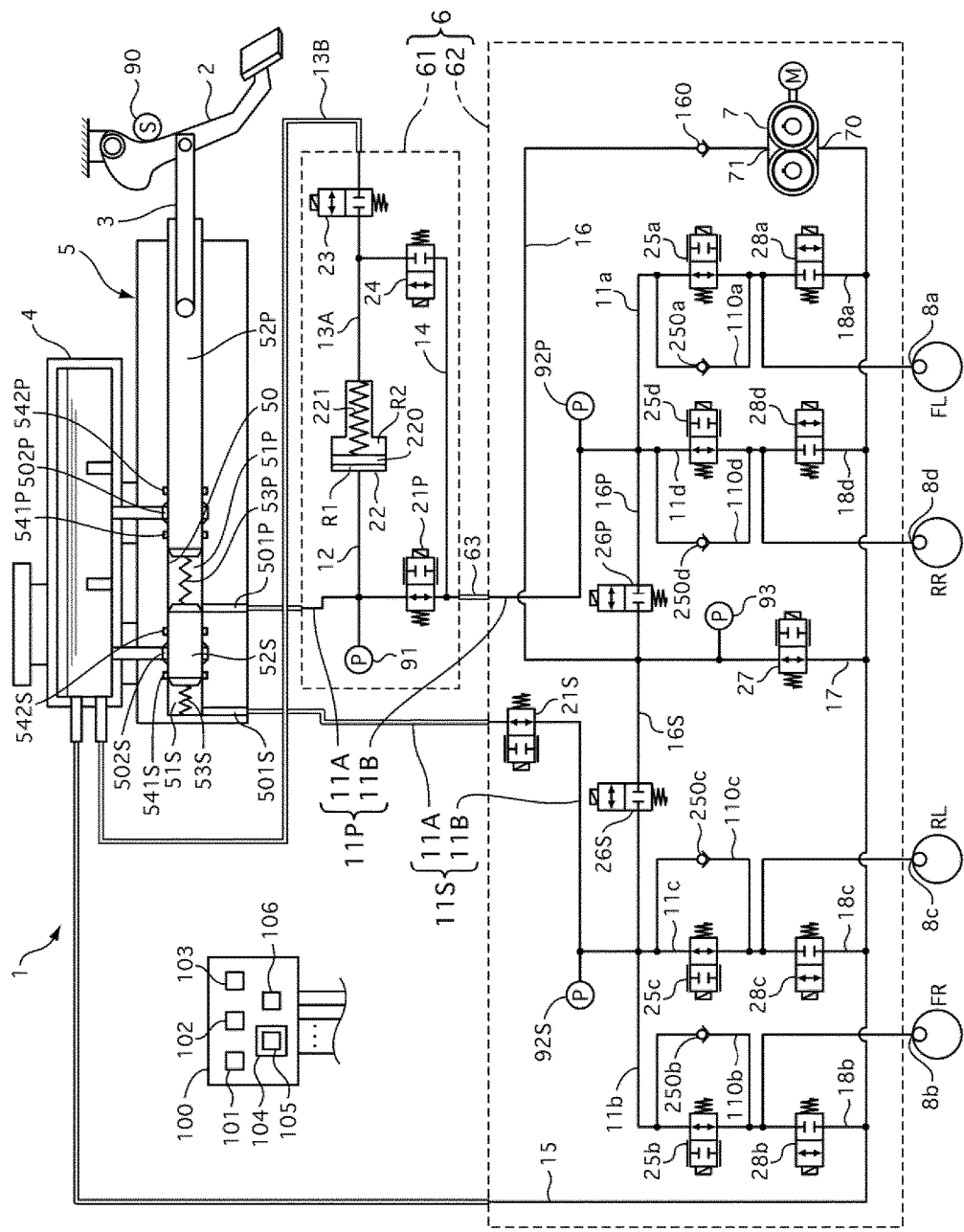
FIG. 1 is a schematic view of a brake control apparatus according to a first embodiment.

[Structure] First as to structure, FIG. 1 is a schematic representation of the structure of the brake control apparatus (hereinafter "apparatus 1") according to the first embodiment. The apparatus 1 is a hydraulic brake apparatus for a brake system of an electric vehicle, such as a hybrid vehicle comprising, in addition to its engine, an electric motor (generator) as a power source for driving the wheels or an electric vehicle comprising only an electric motor (generator) as a power source. Such electric vehicles use a regenerative braking system including a motor (generator) to achieve regenerative vehicle braking by converting the vehicle's kinetic energy into electric energy. The apparatus 1 may also be used in a vehicle that uses its engine alone as a power source. The apparatus 1 transmits brake fluid to a wheel cylinder (caliper) 8 on each of wheels FL to RR of the vehicle to generate brake hydraulic pressure (wheel-cylinder hydraulic pressure), thereby applying hydraulic braking force to each of the wheels FL to RR. The apparatus 1 has two systems (primary system P and secondary system S) of brake piping, for example of X-shaped configuration. The two systems may instead be of front-rear piping configuration or other piping configuration. Below, letters P and S will be attached to the end of each reference character when distinguishing between a member of the system P and a corresponding member of the system S.

A brake pedal 2 is a brake operating member for receiving an input force for braking operation from the driver. The brake pedal 2 is provided with a stroke sensor 90 for measuring a displacement of the brake pedal 2 (a pedal stroke, namely, an amount of operation of the brake pedal 2 by the driver). A reservoir tank (reservoir) 4 is a brake fluid source storing brake fluid, which source is a low-pressure section exposed to atmospheric pressure. A master cylinder 5 generates brake hydraulic pressure (master cylinder pressure) in response to operation of the brake pedal 2 (brake operation) by the driver. The master cylinder 5 is connected via a push rod 3 to the brake pedal 2 and is supplied with brake fluid from the reservoir tank 4. The master cylinder 5 is of tandem type comprising master cylinder pistons that move axially in accordance with brake operation by the driver. The master cylinder pistons are a primary piston 52P connected to the push rod 3 and a secondary piston 52S of free piston type. The apparatus 1 does not include a negative-pressure booster that utilizes intake negative pressure generated by the engine of the vehicle to boost or amplify brake operating force (pedal effort).

The apparatus 1 comprises a hydraulic control unit 6 and an electronic control unit 100. The hydraulic control unit 6 is a control unit that is supplied with brake fluid from the reservoir tank 4 or the master cylinder 5 to generate brake hydraulic pressure, independent of brake operation by the driver. The electronic control unit (hereinafter "ECU") 100 is a controller for the operation of the hydraulic control unit 6.

The hydraulic control unit 6 comprises a first unit 61 and a second unit 62. The hydraulic control unit 6 is located between the wheel cylinders 8 and the master cylinder 5 and is capable of applying master cylinder pressure or hydraulic control pressure to each wheel cylinder 8 individually. The hydraulic control unit 6 has a pump 7 and a plurality of control valves (electromagnetic valves 21 or the like) that serve as a hydraulic device (actuator) for generating hydraulic control pressure. The pump 7 is driven by a motor M to draw brake fluid from the reservoir tank 4 and direct the fluid to the wheel cylinders 8. The pump 7 used in this embodiment is a gear pump having excellent noise/vibration characteristics, namely, an external gear pump unit. The pump 7 is shared by the two systems and driven by the single motor M. The motor M may be, for example, a brush motor. The electromagnetic valves 21 or the like are controlled to open and close in response to a control signal to control a flow of brake fluid. With communication between the master cylinder 5 and the wheel cylinders 8 cut off, the hydraulic control unit 6 uses hydraulic pressure generated by the pump 7 to increase the pressure in the wheel cylinders 8. The hydraulic control unit 6 comprises a stroke simulator 22. The stroke simulator 22 receives brake fluid transmitted from the master cylinder 5 in accordance with the driver's brake operation to generate a pedal stroke. The hydraulic control unit 6 comprises hydraulic sensors 91 to 93 that sense the output pressure from the pump 7, master cylinder pressure, etc.

The ECU 100 receives detection values from a pedal stroke sensor 90 and the hydraulic sensors 91 to 93 and information on driving conditions sent from the vehicle. Using these items of information, the ECU 100 performs information processing, following a stored program. On the basis of the result of this processing, the ECU 100 outputs a control command to each actuator of the hydraulic control unit 6 to control the actuators. More specifically, the ECU 100 controls opening/closing operation of the electromagnetic valves 21 or the like, which change the state of communication of a fluid line 11 or the like, and also controls the speed (the amount of fluid from the pump 7) of the motor M for driving the pump 7. Controlling the hydraulic pressure in the wheel cylinders on the wheel FL to RR in this manner, the ECU 100 achieves boost control that assists in braking operation by generating hydraulic braking force to compensate for any shortage of the driver's braking effort, antilock control for minimizing slip (lockup tendency) of the wheels FL to RR caused by braking, brake control for vehicle dynamics control (vehicle stability control for antiskid, etc.; hereinafter "VDC"), automatic braking control, such as adaptive cruise control, cooperative regenerative braking control for controlling the hydraulic pressure in the wheel cylinders to attain a target deceleration (target braking force) in cooperation with regenerative braking, or such other control.

The master cylinder 5 is connected via the first fluid line 11 (described later) to the wheel cylinders 8 and serves as a first hydraulic pressure source for increasing wheel-cylinder hydraulic pressure. The master cylinder 5 uses master cylinder pressure generated in a first fluid chamber (primary chamber) 51P to apply pressure to wheel cylinders 8a and 8d via a fluid line (first fluid line 11P) of the system P, and also uses master cylinder pressure generated in a second fluid chamber (secondary chamber) 51S to apply pressure to wheel cylinders 8b and 8c via a fluid line (first line 11S) of the system S. The pistons 52 of the master cylinder 5 are inserted in a tubular cylinder 50 having a closed bottom to move axially along the inner circumferential surface of the cylinder 50. The cylinder 50 comprises an outlet port (supply port) 501 and an inlet port 502 both for each of the systems P and S. The outlet port 501 is connected to the hydraulic control unit 6 to communicate with the wheel cylinder 8. The inlet port 502 is communicatively connected to the reservoir tank 4. The first fluid chamber 51P, located between pistons 52P and 52S, contains a compressed coil spring 53P, serving as a return spring. The second fluid chamber 51S, located between the piston 52S and the axial end of the cylinder 50, contains a compressed coil spring 53S. Each of the first and second fluid chambers 51P and 51S has an outlet port 501 normally open thereto.

The cylinder 50 has a plurality of piston seals 54 on the inner circumference thereof. The piston seals 54 are seal members that slide on the seal piston 52P or 52S to seal between the outer circumferential surface of each of the pistons 52P and 52S and the inner circumferential surface of the cylinder. Each piston seal 54 is a seal member (cup seal) of a known cup-shaped cross section having a lip on its inner radial side (though such detail is omitted from the drawings). When the lip is in sliding contact with the outer circumferential surface of the piston 52, brake fluid is allowed to flow in one direction and is prevented from flowing in the other direction. A first piston seal 541 is oriented to allow brake fluid to flow from the inlet port 502 toward the first and second fluid chambers 51P and 51S (outlet port 501), while preventing brake fluid from flowing in the opposite direction. A second piston seal 542 is oriented to allow brake fluid to flow toward the inlet port 502, while preventing fluid brake from flowing out from the inlet port 502. The first and second fluid chambers 51P and 51S decrease in volume to develop hydraulic pressure (master cylinder pressure) as the pistons 52 are moved along a stroke in the axial direction opposite to the brake pedal 2 by the driver stepping on the brake pedal 2. This causes brake fluid to pass from the first and second fluid chambers 51P and 51S through the outlet ports 501 to the wheel cylinders 8. The systems P and S generate substantial equal levels of hydraulic pressure in the first and second fluid chambers 51P and 51S.

Now, the brake fluid pressure circuit of the hydraulic control unit 6 will be described with reference to FIG. 1. Letters a to d are attached to the end of reference characters to indicate members for the wheels FL to RR, respectively. The fluid line 11 connects the outlet ports 501 (first and second fluid chambers 51P and 51S) of the master cylinder 5 to the wheel cylinders 8. A cut valve (cutoff valve) 21 is a normally open electromagnetic valve (that is open when electric current is not applied thereto) in the first fluid line 11. The first fluid line 11 is divided by the cut valve 21 into a fluid line 11A on the master cylinder 5 side and a fluid line 11B on the wheel cylinder 8 side. Solenoid IN valves (pressure increasing valves) SOL/V IN 25 are normally open electromagnetic valves on the respective wheels FL to RR (or in the respective fluid lines 11a to 11d) on the wheel cylinder 8 side (fluid line 8 side) of the cut valve 21 in the first fluid line 11. Disposed in parallel to the first fluid line 11 is a bypass fluid line 110 that bypasses the SOL/V IN 25. The bypass fluid line 110 is provided with a check valve (one-way valve) 250 that admits only brake fluid flowing from the wheel cylinder 8 side to the master cylinder 5 side.

An inlet fluid line 15 connects the reservoir tank 4 to an inlet 70 of the pump 7. An outlet fluid line 16 connects an outlet 71 of the pump 7 to a portion of the first fluid line 11 connecting the cut valve 21 to the SOL/V IN 25. A check valve 160 is an outlet valve of the pump 7 that is located in the outlet fluid line 16 and admits only brake fluid flowing from the outlet 71 side to the first fluid line 11 side. The outlet fluid line 16 divides on the downstream side of the check valve 160 into an outlet fluid line 16P of the system P and an outlet fluid line 16S of the system S. The fluid lines 16P and 16S are connected to the first fluid line 11P of the system P and the first fluid line 11S of the system S, respectively. The outlet fluid lines 16P and 16S form a communication passage interconnecting the first fluid lines 11P and 11S. A communication valve 26P is a normally closed electromagnetic valve (closed when electric current is not applied) provided in the outlet fluid line 16P. A communication valve 26S is a normally closed electromagnetic valve provided in the outlet fluid line 16S. The pump 7 is a second hydraulic pressure source that uses brake fluid supplied from the reservoir tank 4 to generate hydraulic pressure in the first fluid line 11. The pump 7 is connected via the communication passage (outlet fluid lines 16P and 16S) and the first fluid lines 11P and 11S to the wheel cylinders 8a to 8d and can increase wheel-cylinder hydraulic pressure by delivering brake fluid to the communication passage (outlet fluid lines 16P and 16S).

A first pressure-reducing fluid line 17 connects the inlet fluid line 15 to a portion of the outlet fluid line 16 between the check valve 160 and the communication valve 16. A pressure-regulating valve 27 is a normally open electromagnetic valve serving as a first pressure-reducing valve on the first pressure-reducing fluid line 17. A second pressure-reducing fluid line 18 connects the inlet fluid line 15 to a portion of the first fluid line 11 on the wheel cylinder 8 side of the SOL/V IN 25. A solenoid OUT valve (pressure-reducing valve) SOL/V OUT 28 is a normally closed electromagnetic valve serving as a second pressure-reducing valve on the second pressure-reducing line 18. A second fluid line 12 is a branch fluid line that branches off from the first fluid line 11P and connects to the stroke simulator 22. The stroke simulator 22 comprises a piston 220 and a spring 221. The piston 220 is a partition wall that divides the interior of a cylinder of the stroke simulator 22 into two chambers (positive-pressure chamber R1 and back-pressure chamber R2), and is axially movable in the cylinder. The piston 220 has a seal member (not shown) on its outer circumferential surface, facing the inner circumferential surface of the cylinder. The seal member seals off any space on the outer circumference of the piston 220 to prevent communication of brake fluid between the positive-pressure chamber (primary chamber) R1 and the back-pressure chamber (secondary chamber) R2, thereby keeping the chambers R1 and R2 fluid-tight against each other. The spring 221 is an elastic member, namely a spring compressed, for example in the back-pressure chamber R2, so as to always urge the piston 200 toward the positive-pressure chamber R1 (in the direction of reducing the volume of the positive-pressure chamber R1 and increasing the volume of the back-pressure chamber R2). The spring 221 may instead be disposed to extend its natural length. The spring 221 is so disposed as to exert reaction force according to a displacement (stroke) of the piston 220.

The second fluid line 12 branches off from a portion (fluid line 11A) of the first fluid line 11P between the outlet port 50P (first fluid chamber 51P) of the master cylinder 5 and the cut valve 21P and connects to the positive-pressure chamber R1 of the stroke simulator 22. A third fluid line 13 is a back-pressure fluid line connecting the back-pressure R2 of the stroke simulator 22 to the reservoir tank 4. A stroke-simulator OUT valve 23 is a normally closed first simulator cut valve on the third fluid line 13. The third fluid line 13 is divided by the stroke-simulator OUT valve 23 into a fluid line 13A on the stroke simulator 22 side and a fluid line 13B on the reservoir tank 4 side. A fourth fluid line 14 is a branch fluid line that branches off from the first fluid line 11P. The fourth fluid line 14 branches off from a portion of the first fluid line 11P (fluid line 11B) between the cut valve 21P and the SOL/V IN 25 and connects to a portion (fluid line 13A) of the third fluid line 13 between the stroke-simulator OUT valve 23 and the back-pressure chamber R2. The fourth fluid line 14 may instead be connected directly to the back-pressure chamber R2. A stroke-simulator IN valve 24 is a normally closed second simulator cut valve on the fourth fluid line 14. The stroke-simulator IN valve 24 is a normally closed second simulator cut valve on the fourth fluid line 14. The stroke simulator IN valve 24 may instead be a normally open electromagnetic valve.

The pump 7 (outlet 71) is connected via the outlet fluid line 16P, the first fluid line 11P (fluid line 11B), the fourth fluid line 14, and the third fluid line 13 (fluid line 13A) to the back-plate chamber R2 and can increase hydraulic pressure in the back-pressure chamber R2 by delivering (outputting) brake fluid to the outlet fluid line 16P. The pump 7 (outlet 71) is connected via the outlet fluid line 16 and the first fluid line 11 to the master cylinder 5 (fluid chamber 51) and can increase master cylinder pressure by delivering brake fluid to the outlet fluid line 16. The cut valve 21 is disposed on the first fluid line 11 between the pump 7 (outlet 71) and the master cylinder 5 (fluid chamber 51).

The cut valve 21, the SOL/V IN 25, and the pressure-regulating valve 27 are proportional control valves that adjust the degree of valve opening in accordance with electric current applied to their solenoid. The other valves, namely, the communication valve 26, the SOL/V OUT valve 28, the stroke-simulator OUT valve 23, and the stroke-simulator IN valve 24 are on-off valves that are controlled to switch between two values to open and close. These other valves may instead be proportional control valves.

In a portion (fluid line 11A) of the first fluid line 11P between the cut valve 21P and the master cylinder 5 is disposed a hydraulic sensor 91 for sensing hydraulic pressure in that portion (master cylinder pressure and hydraulic pressure in the positive-pressure chamber R1 of the stroke simulator 22). The hydraulic sensor 91 may instead be disposed in the second fluid line 12. In a portion of the first fluid line 11 between the cut valve 21 and the SOL/V IN 25 is disposed a hydraulic sensor (primary-system pressure sensor, secondary-system pressure sensor) 92 for sensing hydraulic pressure (wheel-cylinder hydraulic pressure) in that portion. In a portion of the first pressure-reducing fluid line 17 between its connection to the outlet fluid line 16 and the pressure-regulating valve 27 is disposed a hydraulic sensor 93 for sensing hydraulic pressure (pump outlet pressure) in that portion. The hydraulic sensor 93 may instead be disposed in a portion of the outlet fluid line 16 between the outlet 71 (check valve 160) of the pump 7 and the communication valve 26.

The first unit 61 of the hydraulic control unit 6 comprises, of all the above-described actuators, the cut valve 21P of the system P, the stroke simulator 22, the stroke-simulator OUT valve 23, the stroke-simulator IN valve 24, and the hydraulic senor 91. The second unit 62 comprises the other actuators, namely, the valves 21S and 25 to 28, the hydraulic sensors 92 and 93, and the pump 7. The second unit 62 is integrated with the motor M and the ECU 100. The first unit 61 is located between the master cylinder 5 and the second unit 62. The first and second units 61 and 62 are interconnected by a single brake pipe 63, which is part of the first fluid line 11. The first and second units 61 and 62 are adapted to actively control the master cylinder pressure and the wheel-cylinder hydraulic pressure by controlling the actuators in response to a control command from the ECU 100.

With the cut valve 21 controlled to open, the brake system (first fluid line 11) connecting the fluid chamber 51 of the master cylinder 5 and the wheel cylinders 8 forms a first system that uses master cylinder pressure exerted by pedal effort to generate wheel-cylinder hydraulic pressure and thereby achieves pedal-effort braking (control without boosting). On the other hand, with the cut valve 21 controlled to close, the brake system (inlet fluid line 15, outlet fluid line 16, etc.) including the pump 7 and connecting the reservoir tank 4 and the wheel cylinders 8 forms a second system that uses hydraulic pressure generated by the pump 7 to generate wheel-cylinder hydraulic pressure, that is, a so-called brake-by-wire system that achieves boost control, cooperative regenerative control, or the like.

During brake-by-wire control, the stroke simulator 22 generates reaction force in response to the driver's braking operation. With the cut valve 21 controlled to close and the communication between the master cylinder 5 and the wheel cylinders 8 cut off, the stroke simulator 22 generates a pedal stroke by allowing at least brake fluid coming out of the master cylinder 5 (first fluid chamber 51P) to the first fluid line 11P to flow via the second fluid line 12 into the positive-pressure chamber R1. With the cut valve 21P controlled to close and the stroke-simulator OUT valve 23 controlled to open, establishing communication between the back-pressure chamber R2 and the reservoir tank 4, the stroke simulator 22 generates a pedal stroke in such a manner that the positive-pressure chamber R1 allows brake fluid to flow into or out of the master cylinder 5 as the driver performs braking operation (stepping on the brake pedal 2 or releasing it). More specifically, when the pressure differential between hydraulic pressure (master cylinder pressure acting as a positive pressure) acting on a pressure-receiving surface of the piston 220 in the positive-pressure chamber R1 and hydraulic pressure (back pressure) acting on a pressure-receiving surface of the piston 220 in the back-pressure R2 has reached a predetermined value or higher, the piston 220 compresses the spring 221 and axially moves toward the back-pressure chamber R2, increasing the volume of the positive chamber R1. In this manner, brake fluid flows from the master cylinder 5 (outlet port 501P) via the fluid line (first fluid line 11P and second fluid line 12) into the positive-pressure chamber R1, while brake fluid flows out of the back-pressure chamber R2 via the third fluid line 13 into the reservoir tank 4. The third fluid line 13 serves its purpose as long as it is connected to a low-pressure section into which brake fluid can flow, and is not required to be connected to the reservoir tank 4. When the pressure differential has dropped below the predetermined value, the urging force (resilient force) of the spring 221 returns the piston 220 to its initial position. Since the reaction force exerted by the spring 221 acting on the piston 220 is proportional to the displacement of the piston 220, reaction force generated that acts on the brake pedal 2 (hereinafter "pedal reaction force") is proportional to the operation of the brake pedal 2. Drawing brake fluid from the master cylinder 5 and generating the pedal reaction force in this manner, the stroke simulator 22 reproduces a proper feel of the pedal when depressed, approximating the stiffness of fluid in the wheel cylinders 8.

The ECU 100 comprises: a brake operating condition detector 101; a calculator 102 for calculating a target wheel-cylinder hydraulic pressure; a pedal-effort braking force generator 103; a wheel-cylinder hydraulic pressure controller 104; and a stroke controller 106. The brake operating condition detector 101 receives an input of a value detected by the stroke sensor 90, thereby detecting a displacement (pedal stroke) of the brake pedal 2 as an amount of brake operation. The brake operating condition detector 101 determines whether the driver is operating the brakes (whether the brake pedal 2 is being operated). The stroke sensor 90 is not limited to one that directly detects a displacement of the brake pedal 2, and may be one that detects a displacement of the push rod 3. Alternatively, a pedal sensor for detecting force on the brake pedal 2 may be used to determine an amount of brake operation from a value detected by the pedal sensor. In other words, the amount of brake operation used for control is not limited to the pedal stroke and may be any other proper variable.

The calculator 102 for calculating a target wheel-cylinder hydraulic pressure calculates a target wheel-cylinder hydraulic pressure. For example, during boost control, the calculator 102 for calculating a target wheel-cylinder hydraulic pressure calculates, on the basis of a pedal stroke detected, a target wheel-cylinder hydraulic pressure that achieves a predetermined boost ratio, that is, ideal characteristics of the relation between the pedal stroke and a brake hydraulic pressure required by the driver (a vehicle deceleration G required by the driver). For example, in the case of a brake apparatus comprising a negative-pressure booster of ordinary size, this embodiment uses predetermined characteristics of the relation between a pedal stroke and a wheel-cylinder hydraulic pressure (braking force) achieved during operation of the negative-pressure booster as the above-described ideal relational characteristics for calculating a target wheel-cylinder hydraulic pressure. During antilock control, the calculator 102 for calculating a target wheel-cylinder hydraulic pressure calculates a target wheel-cylinder hydraulic pressure for each of the wheels FL to RR to bring the wheel to a proper degree of slip (amount of deviation of the speed of the wheel from a simulated vehicle speed). During VDC, the calculator 102 for calculating a target wheel-cylinder hydraulic pressure calculates a target wheel-cylinder hydraulic pressure for each of the wheels FL to RR on the basis of, for example, a detected amount of vehicle dynamic conditions (e.g., lateral acceleration) to achieve desired vehicle dynamic conditions. During regenerative cooperation brake control, the calculator 102 for calculating a target wheel-cylinder hydraulic pressure calculates a target wheel-cylinder hydraulic pressure in relation to regenerative braking force. For example, the target wheel-cylinder hydraulic pressure so calculated is such that the sum of a regenerative braking force input from a control unit of a regenerative braking system and a hydraulic braking force corresponding to the target wheel-wheel hydraulic pressure satisfies a vehicle deceleration required by the driver.

The pedal-effort braking force generator 103 controls the cut valve 21 to open and thereby brings the hydraulic control unit 6 into a condition of generating wheel-cylinder hydraulic pressure from master cylinder pressure (first system) to achieve pedal-effort braking.

The wheel-cylinder hydraulic pressure controller 104 controls the cut valve 21 to close and thereby brings the hydraulic control unit 6 into a condition in which the pump 7 (second system) can be used to generate wheel-cylinder hydraulic pressure (pressure-increasing control), so as to perform hydraulic control (e.g., boosting control) that achieves a target wheel-cylinder hydraulic pressure by controlling the actuators of the hydraulic control unit 6. More specifically, the wheel-cylinder hydraulic pressure controller 104 controls the cut valve 21 to close, the communication valve 26 to open, and the pressure-regulating valve 27 to close, and actuates the pump 7. This control enables a desired amount of brake fluid to flow from reservoir tank 4 via the inlet fluid line 15, pump 7, outlet line 16, and first fluid line 11 into the wheel cylinders 8. At the same time, the rotating speed of the pump 7 and the opening (e.g., degree of opening) of the pressure-regulating valve 27 are controlled by feedback to bring a value detected by the hydraulic sensor 92 toward a target wheel-cylinder hydraulic pressure, thereby providing a desired braking force. In this embodiment, in principle, the pressure-regulating valve 27, rather than the pump 7, is adjusted to control wheel-cylinder hydraulic pressure. The pressure-regulating valve 27, since it is a proportional control valve, can be finely controlled to achieve smooth control of wheel-cylinder hydraulic pressure. Cutting off the communication between the master cylinder 5 side and the wheel cylinder 8 side by controlling the cut valve 8 to close makes it easy to control wheel-cylinder hydraulic pressure independently of the driver's pedal operation. During normal braking in which a braking force corresponding to the driver's brake operation (pedal stroke) is generated in the front and rear wheels FL to RR, the wheel-cylinder hydraulic pressure controller 104 performs boost control. In the boost control, the SOL/V IN 25 on each of the wheels FL to RR is controlled to open, and the SOL/V OUT 28 is controlled to close.

The wheel-cylinder hydraulic pressure controller 104 has an antilock controller 105. The antilock controller 105 reads the speed of each of the wheels FL to RR as vehicle information and detects and monitors the slip condition of the wheels FL to RR. When any of the wheels FL to RR is determined to have a lockup tendency while braking force is applied to the wheels FL to RR (e.g., during the driver's braking operation), that is, when the degree of slip of that wheel is determined to be excessive, the wheel-cylinder hydraulic pressure controller 104 intervenes in hydraulic control (boost control) for brake operation and controls the hydraulic pressure in the wheel cylinder with an excessive degree of slip to increase or decrease, with the cut valve 21 controlled to close. This control brings the degree of slip of that wheel to a proper value. More specifically, with the cut valve 21 controlled to close, the communication valve 26 controlled to open, and the pressure-regulating valve 27 controlled to close, the pump 7 is actuated. This control enables a desired amount of brake fluid to flow from the reservoir tank 4 via the inlet fluid line 15, pump 7, outlet fluid line 16, and first fluid line 11 into the wheel cylinders 8. At this stage, if a hydraulic-pressure command for a wheel cylinder 8 under control is to increase the hydraulic pressure, the SOL/V IN 25 on that wheel cylinder 8 is controlled to open, and the SOL/V OUT 28 is controlled to close, so as to bring brake fluid into the wheel cylinder 8 for pressure increase therein. If a hydraulic pressure command for the wheel cylinder 8 is to reduce the hydraulic pressure, the SOL/V IN 25 on that wheel cylinder 8 is controlled to close, and the SOL/V OUT 28 is controlled to open, so as to bring brake fluid in the wheel cylinder 8 into the inlet fluid line 15 for pressure decrease. If a hydraulic-pressure command for the wheel cylinder 8 is to hold the hydraulic pressure, the SOL/V OUT 28 and SOL/V IN 25 on the wheel cylinder 8 are controlled to close, thereby keeping the hydraulic pressure in the wheel cylinder 8 unchanged.

The stroke controller 6 controls the operation of the stroke-simulator IN valve 24 and the stroke-simulator OUT valve 23 to control the operating conditions of the stroke simulator 22. In this control, the stroke of the piston 52P of the master cylinder 5 is controlled to enable active control of the operation of the brake pedal 2. When pedal-effort braking is performed by the pedal-effort braking force generator 103, the stroke controller 106 does not operate the stroke simulator 22 in response to the driver's brake operation. That is, the stroke controller 106 controls the stroke-simulator OUT valve 23 to close. The stroke-simulator IN valve 24 is also controlled to close. Alternatively, the stroke-simulator IN valve 24 may be controlled to open.

During the control of hydraulic pressure by the wheel-cylinder hydraulic pressure controller 104, the stroke controller 106 actuates the stroke simulator 22 as the driver operates the brakes. When the brake operating condition detector 101 detects the absence of brake operation, the stroke controller 106 prevents operation of the stroke simulator 22. More specifically, the stroke controller 106 controls the stroke-simulator OUT valve 23 and stroke-simulator IN valve 24 to close. When the brake operating condition detector 101 has detected braking operation, the stroke controller 106 actuates the stroke simulator 22 in accordance with the driver's braking operation when antilock control is not performed by the antilock controller 105. More specifically, the stroke controller 106 controls the stroke-simulator OUT valve 23 to open and the stroke-simulator IN valve 24 to close. When the brake operating condition detector 101 has detected braking operation and the antilock controller 105 is performing antilock control, the stroke controller 106 actuates the stroke-simulator IN valve 24 and the stroke-simulator OUT valve 23 in accordance with the condition of the antilock control. In other words, to reduce wheel-cylinder hydraulic pressure in the antilock control, the stroke controller 106 controls the stroke-simulator OUT valve 23 to close and the stroke-simulator IN valve 24 to open. To increase the wheel-cylinder hydraulic pressure during the antilock control, the stroke controller 106 controls the stroke-simulator OUT valve 23 to open and the stroke-simulator IN valve 24 to close. To hold the wheel-cylinder hydraulic pressure during the antilock control, the stroke controller 106 controls the stroke-simulator OUT valve 23 and the stroke-simulator IN valve 24 to close.

Figure 2:
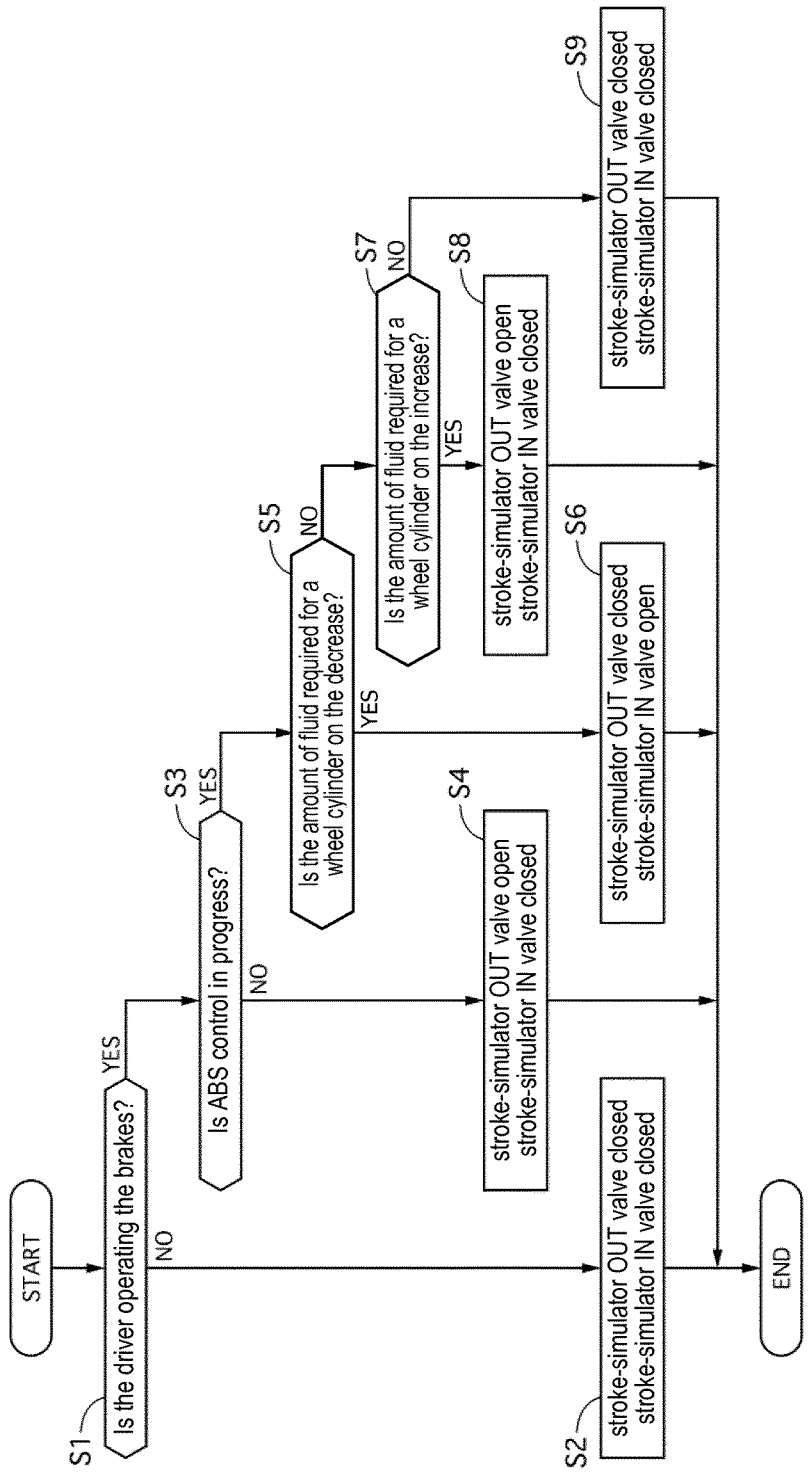
FIG. 2 is a flowchart of stroke control of a master cylinder piston by the brake control apparatus according to the first embodiment.

FIG. 2 is a flowchart of the control by the stroke controller 106. This process is programmed as software in the ECU 100 and is repeated at predetermined intervals. As a prerequisite for this process, hydraulic pressure control by the wheel-cylinder hydraulic pressure controller 104 is in progress at the start of the process in FIG. 2. That is, the wheel cylinders 8 have received some hydraulic-pressure command, and the pump 7 is in operation, with the cut valve 21 controlled to close, the pressure-regulating valve 27 controlled to close (feedback-controlled in degree of opening or the like) and the communication valve 26 controlled to open. Step S1 determines the presence or absence of operation of the brake pedal 2 on the basis of information sent from the brake operating condition detector 101. If no pedal operation is detected (in other words, if braking operation is not performed), the process proceeds to step 2. If pedal operation is detected, the process proceeds to step S3. In step 2, the stroke-simulator OUT valve 23 and the stroke-simulator IN valve 24 are controlled to close. Step S3 determines whether antilock control is in progress on the basis of information sent from the antilock controller 105 (or on the basis of the computation by the ECU 100). If antilock control is not detected, the process proceeds to step S4. If antilock control is in progress, the process proceeds to step S5. In step S4, the stroke-simulator OUT valve 23 is controlled to open, and the stroke-simulator IN valve 24 is controlled to close.

Step S5 computes the sum of the amounts of brake fluid required for the wheel cylinders 8 on a certain plurality of wheels FL to RR (hereinafter "required amounts of brake fluid") from information sent from the antilock controller 105 (from the condition of the ongoing antilock control) on the basis of brake forces required for that certain plurality of wheels FL to RR (on the basis of target wheel-cylinder hydraulic pressures), and then determines whether the required amounts of brake fluid (the sum) are on the decrease. If they are determined to be on the decrease, the process proceeds to step S6. If not, the process proceeds to step S7.

Step S5 uses the sum of the required amounts of brake fluid as a parameter for determining, with improved accuracy, changes in the amount of brake fluid in the apparatus 1 as a whole resulting from a decrease/hold/increase in wheel-cylinder hydraulic pressure during antilock control. More specifically, to decrease braking force on a wheel to avoid slipping, the amount of brake fluid required for the wheel cylinder 8 on that wheel is reduced. In principle, a reduction in required amount of brake fluid leads to a reduction in wheel-cylinder hydraulic pressure. In the meantime, the braking force on another wheel may be increased on the same timing. In that case, the amount of brake fluid required for the wheel cylinder 8 on that wheel increases. It is desirable that an increase or decrease in the sum of the amounts of brake fluid required for the wheel cylinders 8 on all such wheels is taken into account to determine a change in the brake fluid in the apparatus 1 as a whole. In this embodiment, that certain plurality of wheels are four wheels (front and rear wheels FL to RR). This embodiment calculates the sum of the amounts of brake fluid required for the wheel cylinders 8 on those wheels. If the sum of the required amounts of brake fluid is, for example, changed to the decrease, it can be determined that the wheel-cylinder hydraulic pressure in the apparatus 1 as a whole is on the decrease. In general, however, the wheel cylinders 8a and 8b on the front wheels FL and FR consume a greater amount of brake fluid than the wheel cylinders 8c and 8d on the rear wheels RL and RR. For this reason, it is possible to compare only the right and left wheel cylinders 8a and 8b on the front wheels (in other words, calculate the sum of the amounts of brake fluid required for the wheel cylinders 8a and 8b on the right and left front wheels) in determining a change in the amount of brake fluid for the apparatus 1 as a whole (an increase or decrease in wheel-cylinder hydraulic pressure exerted by the apparatus 1 as a whole), and it is not always required to take all of the wheels FL to RR into account.

In step S6, the stroke-simulator OUT valve 23 is controlled to close, and the stroke-simulator IN valve 24 is controlled to open. More specifically, the stroke-simulator IN valve 24 is opened for a predetermined period of time. Step S7 determines whether the required amounts of brake fluid (the sum) are changed to the increase. If they are changed to the increase, the process proceeds to step S8. If not, the process proceeds to step S9. In step S8, the stroke-simulator OUT valve 23 is controlled to open, and the stroke-simulator IN valve 24 is controlled to close. More specifically, the stroke-simulator OUT valve 23 is controlled to open for a predetermined period of time. In step S9, the stroke-simulator OUT valve 23 and the stroke-simulator IN valve 24 are controlled to close.

Working

This embodiment brings about the following working. The stroke controller 106 actuates the stroke simulator 22 in accordance with the driver's braking operation during hydraulic control. When the brakes are not in operation, the stroke controller 106 controls the stroke-simulator OUT valve 23 and the stroke-simulator IN valve 24 to close and thereby cuts off communication between the back-pressure chamber R2 and the low-pressure section (reservoir)/the high-pressure section (the outlet 71 of the pump 7). This puts the stroke simulator 22 into inoperative state. In other words, the issuance of a wheel-cylinder hydraulic command when the brake pedal 2 is not operated indicates, for example, the time when braking force is generated for control (VDC) for antiskid or the time when braking force is generated when the vehicle is decelerating under control to keep a certain distance from the vehicle in front. In such time, it is not necessary to transmit reaction force to the brake pedal 2 even during antilock control. For this reason, when the brakes are not in operation, the stroke-simulator OUT valve 23 and the stroke-simulator IN valve 24 are controlled to close to make the pedal stroke constant (substantially zero).

When the vehicle is not under antilock control during braking operation, the stroke-simulator OUT valve 23 is controlled to open to establish communication between the back-pressure chamber R2 of the stroke simulator 22 and the low-pressure section (reservoir). The stroke-simulator IN valve 24 is controlled to close so as to cut off communication between the back-pressure chamber R2 and the high-pressure section (outlet 71 of the pump 7). In this manner, the stroke simulator 22 is actuated in accordance to the driver's brake operation. Since the vehicle is in normal braking operation, pedal stroke is controlled by allowing brake fluid released from the master cylinder by the driver's pedal operation to flow into the positive-pressure chamber R1 of the stroke simulator 2. This gives the driver a proper feel of the pedal.

When the vehicle is under antilock control during braking operation, the stroke-simulator IN valve 24 and the stroke-simulator OUT valve 23 are actuated in accordance with the condition of the antilock control, and hydraulic pressure generated by the pump 7 is used to actuate the stroke simulator 22. By giving the piston 52P of the master cylinder 5 a stroke in this manner and controlling the amount (position) of the stroke, the position of the pedal stroke 2 (pedal stroke) is controlled.

More specifically, when the wheel-cylinder hydraulic pressure is reduced (when the sum of required amounts of brake fluid is reduced), the stroke-simulator OUT valve 23 is controlled to close so as to cut off communication between the back-pressure chamber R2 and the low-pressure section (reservoir). The stroke-simulator IN valve 24 is controlled to open so as to establish communication between the back-pressure chamber R2 and the high-pressure section (outlet 71 of the pump 7). This increases the pressure in the back-pressure chamber R2. In other words, brake fluid is transmitted from the first fluid line 11P (fluid line 11B), which is under high pressure owing to the outlet pressure of the pump 7, via the fourth fluid line 14 into the third fluid line 13. The back-pressure chamber R2 of the stroke simulator 22, communicating with the third fluid line 13, increases in pressure. When force exerted on the piston 220 by the pressure in the back-pressure chamber R2 (which hereinafter means the sum of this force and the reaction force exerted by the spring 221) has exceeded force exerted on the piston 220 by the pressure in the positive-pressure chamber R1 (master cylinder pressure), the piston 220 moves toward the positive-pressure chamber R1. This allows hydraulic pressure to flow via the second fluid line 12 and the first fluid line 11P (fluid line 11A) into the first fluid chamber 51P of the master cylinder 5, increasing the pressure (master cylinder pressure) in the first fluid chamber 51P. This in turn increases the pedal reaction force. When the force exerted on the piston 52P of the master cylinder 5 by an input (stepping force) to the brake pedal 2 has dropped below the force exerted on the piston 52P by the master cylinder pressure (which hereinafter means the sum of this force and the urging force of the coil spring 53P), the piston 52 is pushed backward toward the pushrod 3. This reduces pedal stroke. In other words, the brake pedal 2 moves in its return direction. The amount by which the brake pedal 2 returns can be determined by the relation between braking force (target wheel-cylinder hydraulic pressure) required for each of the wheels FL to RR or a required amount of brake fluid during antilock control and the pedal stroke and braking force (or consumed amount of brake fluid) during normal braking. The braking force (target wheel-cylinder hydraulic pressure) required for each of the wheels FL to RR or required amount of brake fluid during antilock control reflects the frictional resistance (road frictional force) of the road on which the vehicle is travelling, and the calculated value of the braking force or required amount of brake fluid decreases, for example, with decreasing road frictional force. The amount of return of the brake pedal 2 so determined can be used to set a time period for opening the stroke-simulator IN valve 24.

To increase wheel-cylinder hydraulic pressure (to increase the sum of required amounts of brake fluid), the stroke-simulator OUT valve 23 is controlled to open so as to establish communication between the back-pressure chamber R2 and the low-pressure section (reservoir tank 4). Closing the stroke-simulator IN valve 24 cuts off communication between the back-pressure chamber R2 and the high-pressure section (outlet 71 of the pump 7). This reduces the pressure in the back-pressure chamber R2. Since the fluid line 13A is connected via the fluid line 13B to the reservoir tank 4, the back-pressure chamber R2, communicating with the fluid line 13A, decreases in pressure. When the force exerted on the piston 220 by the pressure in the back-pressure chamber R2 has dropped below the force exerted on the piston 220 by the pressure (master cylinder pressure) in the positive-pressure chamber R1, the piston 220 moves toward the back-pressure chamber R2. This reduces the pressure (master cylinder pressure) in the first fluid chamber 51P, communicating through the first fluid line 11P (fluid line 11A) and the second fluid line 12 with the positive-pressure chamber R1. This in turn reduces pedal reaction force. When the force exerted on the piston 52P by an input (pedal effort) to the brake pedal 2 has exceeded the force exerted on the piston 52P by the master cylinder pressure, the piston 52P moves toward the first fluid chamber 51P. This increases pedal stroke. In other words, the brake pedal 2 moves in the direction of pedal effort. The distance of this movement of the brake pedal 2 can be determined from the relation between the braking force (target wheel-cylinder hydraulic pressure) required for each of the wheels FL to RR in antilock control or required amount of brake fluid and pedal stroke and braking force (or consumed amount of brake fluid) during normal braking. As described above, the braking force (target wheel-cylinder hydraulic pressure) required for each of the wheels FL to RR in antilock control or the required amount of brake fluid reflects road frictional force. The distance of movement of the brake pedal 2 determined in the above-described manner can be used to set a time period for opening the stroke-simulator OUT valve 23.

To hold the wheel-cylinder hydraulic pressure (to prevent the sum of required amounts of brake fluid from increasing or decreasing), the stroke-simulator OUT valve 23 and the stroke-simulator IN valve 24 are controlled to close so as to cut off communication between the back-pressure chamber R2 and the low-pressure section (reservoir)/high-pressure section (outlet 71 of the pump 7). This keeps pedal reaction force and pedal stroke from changing and thus holds the position of the brake 2 substantially fixed. In this manner, the operation of the stroke-simulator IN valve 24 and the stroke-simulator OUT valve 23 is properly controlled during antilock control according to the operating condition of antilock control (according to the control condition of each wheel cylinder 8). Properly controlling the pedal stroke and pedal reaction force in this manner makes it possible to generate or adjust pedal stroke and pedal reaction force and thereby minimize a sense of unease the driver may experience. In this way, a pedal feel that is hardly disconcerting to the driver can be achieved.

There are conventionally known brake control systems that control the operation of a brake control member used by the driver to perform brake operation. To control the operation of the brake operating member, such control systems are adapted to control the operation of a hydraulic pressure source, with the communication between master cylinder and wheel cylinders cut off, to generate a desired amount of brake hydraulic pressure, while adjusting reaction force exerted by the stroke simulator, on which hydraulic pressure from the master cylinder acts. Such a control system is commonly referred to as a brake-by-wire system. Also commonly known are antilock controllers that minimize wheel slip during braking. There are well-known brake apparatuses that perform antilock control without a brake-by-wire system, the brake apparatuses comprising: a negative-pressure booster between the brake operating member and the master cylinder, the negative-pressure booster boosting the operating force exerted by the driver and transmitting brake fluid from the master cylinder to the wheel cylinders; and an actuator for the antilock control device, the actuator being disposed between the master cylinder and the wheel cylinders. Upon starting antilock control, such a brake apparatus controls the pressure in the wheel cylinders to decrease in order to reduce wheel slip and returns excessive brake fluid via a pump to the master cylinder. This increases the pressure in the master cylinder. When the force resulting from this pressure has exceeded the output from the negative-pressure booster, the brake operating member is moved back. When the tire slip is sufficiently reduced, the antilock control device controls the pressure in the wheel cylinders to increase. For this purpose, brake fluid is transmitted from the master cylinder to the wheel cylinders. This reduces the pressure in the master cylinder. When the force resulting from this pressure has dropped below the output from the negative-pressure booster, the brake operating member moves in its forward direction. The amount of brake fluid required for a wheel cylinder decreases with decreasing road frictional force. For this reason, a less amount of brake operation (with the brake operating member closer to its original position) is required to balance force when road frictional force is small than when it is large, and it is difficult to move the brake operating member any further. In this way, antilock control causes the brake operating member to move forward and backward (in the return direction and in the forward direction) and enables the driver to perceive the antilock control. Since the brake operating member moves by a distance corresponding to an amount of brake fluid required for the wheel cylinder (according to road frictional force), the position of the brake operating member serves as an indicator that can be used by the driver to estimate the road frictional force (limit of adhesion).

Since a brake-by-wire system does not communicate between the master cylinder and the wheel cylinders, hydraulic changes in the wheel cylinders during antilock control do not affect the master cylinder. In contrast, brake apparatuses, like that disclosed in Patent Reference 1, having an on-off valve between the stroke simulator and the master cylinder, open and close the on-off valve during antilock control to increase and decrease reaction force in response to operation of the brake operating member, thereby notifying the driver of the ongoing antilock control, as is known in the art. Such a conventional brake apparatus, however, can limit the amount of operation (displacement)

in the forward direction by closing the on-off valve and thus increasing reaction force in response to operation of the brake operating member, but cannot move the brake operating member in its return direction. As such, failure to bring the brake operating member to a proper position (a position close to that to which the above-described brake apparatus performing antilock control without a brake-by-wire system would bring the brake operating member) gives the driver a sense of unease, aggravates a feel of the brakes when operated, and causes the driver to misestimate road frictional force (or makes it impossible for the driver to estimate).

In contrast, the apparatus 1 of this embodiment, when performing antilock control as a brake-by-wire system, controls the valves 23 and 24 and uses hydraulic pressure generated by the pump 7 as a hydraulic pressure source, thereby imparting a stroke to the piston 52P of the master cylinder 5. This makes it possible to control the brake pedal 2, which is a brake operating member, to a proper position (pedal stroke). In other words, the apparatus 1 of this embodiment provides improved reaction to the brake pedal 2 during antilock control (closely approximating the above-described brake apparatus performing antilock control without a brake-by-wire system) to overcome the above-described problem.

For example, the fluid line 11B of the first fluid line 11 undergoes changes in pressure resulting from a pressure increase or decrease in the wheel cylinders 8. However, since the fluid line 11A is separated from the fluid line 11B by the cut valve 21, changes in the pressure in the fluid line 11B do not affect the fluid line 11A. In such state, a change in master cylinder pressure does not occur. In the case where the stroke-simulator OUT valve 23 is opened during antilock control, the relation between pedal reaction force and pedal stroke during antilock control is the same as that without antilock control and remains unchanged. In contrast, the stroke controller 106 of this embodiment recognizes a decrease in wheel-cylinder hydraulic pressure (a decrease in the sum of required amounts of brake fluid) during antilock control as the driver's excessive depression of the brake pedal and thus increases pedal reaction force to reduce pedal stroke. When wheel-cylinder hydraulic pressure increases during antilock control (when the sum of required amounts of brake fluid increases), the stroke controller 106 recognizes this increase as a condition in which the driver's further depression of the brake pedal 2 would not pose a problem, and reduces pedal reaction force to increase pedal stroke. This makes it possible to bring the pedal brake to a proper position (a position close to that to which the above-described brake apparatus performing antilock control without a brake-by-wire system would bring the brake operating member). Further, the brake pedal 2 moves in its return direction, as well as in the forward direction. This minimizes the possibility of the driver feeling a sense of unease. Setting the amount of time for opening each of the valves 23 and 24 in the above-described manner adjusts pedal stroke to a smaller value when road frictional force is small than that when it is large and to a larger value when road frictional force is large than that when it is small. In short, the pedal brake 2 moves by a distance corresponding to the amount of brake fluid required for the wheel cylinder 8 (in accordance with road frictional force). The pedal stroke therefore serves as an indicator that can be used by the driver to estimate the road frictional force properly and prevents misestimating the road frictional surface.

When antilock control has ended while hydraulic control is in progress during brake operation, the process in FIG. 2 proceeds to step S4 to control the stroke-simulator OUT valve 23 to open and the stroke-simulator IN valve 24 to close. In this way, immediately after antilock control ends, it is possible to give the driver a pedal feel as he would experience during normal braking. As such, a pedal feel that hardly causes a sense of unease in the driver can be created.

Regardless of control of the pressure on the back-pressure chamber R2 side during antilock control and the movement of the pistons 220 and 52P resulting from that control, the amount of brake fluid present in the section on the positive-pressure chamber R1 side upstream of the cut valve 21P (in other words, in the section between the first fluid chamber 51P of the master cylinder 5, the first fluid line 11P (fluid line 11A), and between the second fluid line 12 and positive-pressure chamber R1) does not vary between before and after antilock control. The balance between the incoming and outgoing amounts of fluid on the positive-pressure chamber R1 side remains unbroken. In other words, the amount of fluid on the positive-pressure chamber R1 side after the antilock control does not differ from that during hydraulic control before the antilock control. Therefore, the relation between pedal effort and pedal stroke does not fluctuate from the beginning of antilock control until the end of the antilock control. As such, a pedal feel that hardly causes a sense of unease in the driver can be created.

The fourth fluid line 14 connects a portion (fluid line 13) between the stroke-simulator OUT valve 23 on the third fluid line 13 and the back-pressure chamber R2 to a portion between the cut valve 21P on the first fluid line 11P (fluid line 11B) and the SOL/V IN25. This shortens the distance of the fluid line from the wheel cylinders 8 to the back-pressure chamber R2, compared with that if the fourth fluid line 14 were connected, not to the first fluid line 11P, but for example to the fluid line 16 on the outlet side of the pump 7, and simplifies the fluid line configuration of that route. In this embodiment, the hydraulic control unit 6 is provided with two separate units (units 61 and 62), with the cut valve 21P of the system P, the stroke simulator 22, the stroke-simulator OUT valve 23, and the stroke-simulator IN valve 24 disposed in the unit 61. Such structure makes it possible to contain the fourth fluid line 14 in the unit 61. This eliminates the need for connecting the two units 61 and 62 via the brake pipe that forms the fourth fluid line 14. This in turn simplifies the apparatus 1 as a whole.

[Effects]

The first embodiment of the present invention brings about the following effects:

(1) The brake control apparatus 1 comprises: the first fluid line 11 connecting the master cylinder 5, which generates hydraulic pressure by a stroke of the piston 52 in response to the driver's braking operation, to the wheel cylinders 8 on the wheels FL to RR; the pump (hydraulic pressure source) for generating hydraulic pressure in the first fluid line 11 with brake fluid supplied from the reservoir tank 4; the cut valve 21 in the first fluid line 11 between the pump 7 and the master cylinder 5; the stroke simulator 22 for generating reaction force in response to the driver's braking operation, the stroke simulator 22 comprising the positive-pressure chamber R1 and the back-pressure chamber R2 that are separated by the piston 220 (partition wall); the second fluid line 12 connecting the positive-pressure R1 (one of the two chambers of the stroke simulator 22) to a portion between the cut valve 21P on the first fluid line 11P and the master cylinder 5; the third fluid line 13 connecting the back-pressure chamber R2 (the other chamber of the stroke simulator 22) to the reservoir tank 4 (low-pressure section); the stroke-simulator OUT valve 23 on the third fluid line 13; the fourth fluid line 14 connecting a portion between the stroke-simulator OUT valve 23 on the third fluid line 13 and the back-pressure chamber R2 to a portion between the cut valve 21P on the first fluid line 11P and the wheel cylinders 8; the stroke-simulator IN valve 24 on the fourth fluid line 14; and the antilock controller 105 for detecting any slip of the wheels FL to RR and increasing and decreasing the hydraulic pressure in the wheel cylinders 8, wherein at least during operation of the antilock controller 105, the valves 23 and 24 are actuated to impart a stroke to the piston 52 with hydraulic pressure generated by the pump 7.

Imparting a stroke to the piston 52P makes it possible to control the position of the brake pedal 2 (brake operating member) properly.

(2) The brake control apparatus 1 further comprises the hydraulic pressure controller 104 that actuates the cut valve 21 to close and uses pump 7 (hydraulic pressure source) to increase wheel-cylinder hydraulic pressure, wherein when the antilock controller 105 has started antilock control during control by the hydraulic pressure controller 104, the valves 23 and 24 are actuated to impart a stroke to the piston 52P with hydraulic pressure generated by the pump 7.

This makes it possible to control the position of the brake pedal 2 properly during brake-by-wire operation.

(3) The brake control apparatus 1 further comprises the solenoid IN valves SOL/V IN 25 on the first fluid line 11 between the cut valve 21 and the wheel cylinders 8, wherein the forth fluid line 14 is connected to a portion between the cut valve 21P on the first fluid line 11P and the SOL/V IN 25.

This shortens and simplifies the fluid passage extending from the wheel cylinders 8 to the back-pressure chamber R2.

(5) The piston 220 (partition wall) moves to impart a stroke to the piston 52.

This active movement of the stroke simulator 22 makes it possible to control the position of the brake pedal 2.

(7) The brake control apparatus 1 further comprises the brake operating condition detector 101 for determining whether the driver is operating the brakes, wherein when the brake operating condition detector 101 detects brake operation in progress and the antilock controller 105 is not in operation, the stroke-simulator OUT valve 23 is actuated to open and the stroke-simulator IN valve 24 is actuated to close.

This makes it possible to control the position of the brake pedal 2 during brake operation when antilock control is not in progress.

(8) When the brake operating condition detector 101 detects brake operation in progress and the antilock controller 105 operates to reduce wheel-cylinder hydraulic pressure, the stroke-simulator OUT valve 23 is actuated to close and the stroke-simulator IN valve 24 is actuated to open.

This makes it possible to control the position of the brake pedal 2 during brake operation and antilock pressure-reducing control.

(9) When the brake operating condition detector 101 detects brake operation in progress and the antilock controller 105 operates to increase wheel-cylinder hydraulic pressure, the stroke-simulator OUT valve 23 is actuated to open and the stroke-simulator IN valve 24 is actuated to close.

This makes it possible to control the position of the brake pedal 2 during brake operation and antilock pressure-increasing control.

(10) When the brake operating condition detector 101 detects brake operation in progress and the antilock controller 105 operates to hold wheel-cylinder hydraulic pressure, the stroke-simulator OUT valve 23 and the stroke-simulator IN valve 24 are actuated to close.

This makes it possible to control the position of the brake pedal 2 during brake operation and antilock holding control.

(11) The brake control apparatus 1 comprises the first fluid line 11 connecting the master cylinder 5, which generates hydraulic pressure by a stroke of the piston 52 in response to the driver's braking operation, to the wheel cylinders 8 on the wheels FL to RR; the pump 7 (hydraulic pressure source) for generating hydraulic pressure in the first fluid line 11 with brake fluid supplied from the reservoir tank 4; the cut valve 21 on the first fluid line 11 between the pump 7 and the master cylinder 5; the stroke simulator 22 for generating reaction force in response to the driver's braking operation, the stroke simulator 22 comprising the positive-pressure chamber R1 and the back-pressure chamber R2 that are separated by the piston 220 (partition wall); the second fluid line 12 connecting the positive-pressure R1 (one of the two chambers of the stroke simulator 22) to a portion between the cut valve 21P on the first fluid line 11P and the master cylinder 5; the third fluid line 13 connecting the back-pressure chamber R2 (the other chamber of the stroke simulator 22) to the reservoir tank 4 (low-pressure section); the stroke-simulator OUT valve 23 on the third fluid line 13; the fourth fluid line 14 connecting a portion between the stroke-simulator OUT valve 23 on the third fluid line 13 and the back-pressure chamber R2 to a portion between the cut valve 21P on the first fluid line 11P and the wheel cylinders 8; the stroke-simulator IN valve 24 on the fourth fluid line 14; the hydraulic pressure controller 104 for actuating at least the cut valve 21 to close and increasing wheel-cylinder hydraulic pressure with the pump 7; the antilock controller 105 for increasing or decreasing the hydraulic pressure in the wheel cylinders 8 upon detecting a lockup tendency in a wheel; and the stroke controller 106 for actuating the stroke-simulator IN valve 24 and the stroke-simulator OUT valve 23, at least during operation of the antilock controller 105, so as to impart a stroke to the piston 52 with hydraulic pressure generated by the pump 7.

This brake control apparatus brings about the effects described in (1) and (2) above.

(20) A brake control method using a brake control apparatus 1 comprising a stroke simulator 22 for generating reaction force in response to the driver's brake operation by allowing brake fluid flowing from the master cylinder 5, which generates hydraulic pressure by a stroke of the piston 52 in response to the driver's brake operation, to flow into one (positive-pressure chamber R1) of two separate chambers, a stroke-simulator OUT valve 23 on a third fluid-line 13 between the other chamber (back-pressure chamber R2) of the stroke simulator 22 and the reservoir tank (reservoir) 4; and a stroke-simulator IN valve 24 on a fourth fluid line 14 connecting a third fluid line 13 (fluid line 13A), located between the back-pressure R2 and the stroke-simulator OUT valve 23, to the pump 7 (hydraulic pressure source), wherein the stroke-simulator OUT valve 23 and the stroke-simulator IN valve 24 are actuated during antilock control, and hydraulic pressure generated by the pump 7 is used to control the position of the piston 52P.

This brings about the effect as stated in (1) above.

Embodiment 2

Figure 3:
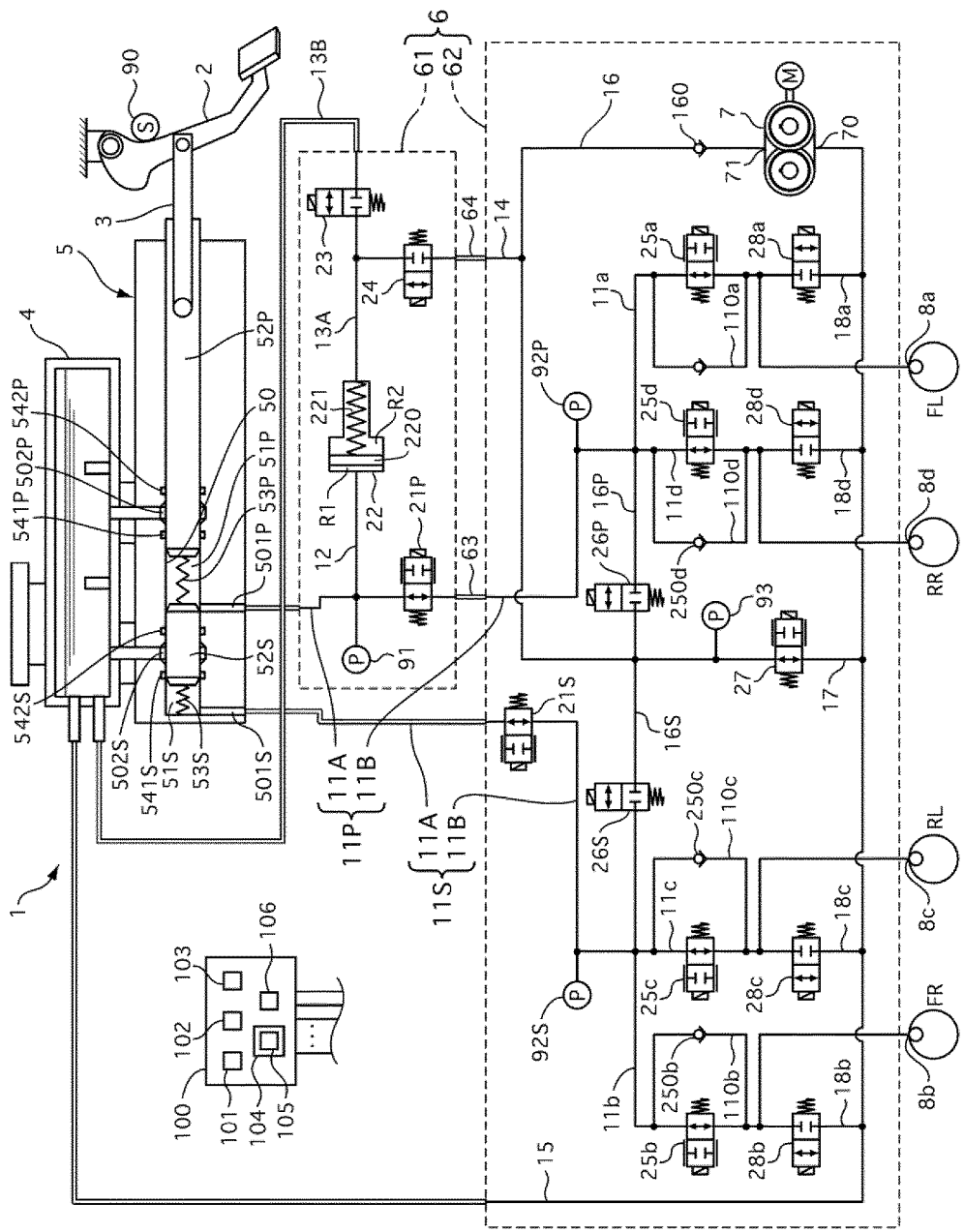
FIG. 3 is a schematic view of a brake control apparatus according to a second embodiment.

FIG. 3 schematically shows the structure of a brake control apparatus 1 according to the second embodiment. The apparatus 1 of this embodiment comprises a fourth fluid line 14 connected, not to a line (fluid line 11B) between the cut valve 21P on the first fluid line 11P and the wheel cylinders 8 like that of the first embodiment, but to a fluid line 16 on the outlet side of the pump 7. More specifically, the fourth fluid line 14 branches off from a portion in the output fluid line 16 between the check valve 160 and the communication valve 26P and connects to a line (fluid line 13A) in a third fluid line 13 between the stroke-simulator OUT valve 23 and the back-pressure chamber R2. First and second units 61 and 62 are connected by two brake pipes 63 and 64, which are parts of the first fluid line 11P and the fourth fluid line 14, respectively. Since other elements of the second embodiment are the same as those of the first embodiment, their description is omitted by assigning the same reference numerals as those used in the first embodiment.

When the stroke controller 106 opens the stroke-simulator IN valve 24, the back-pressure chamber R2 and the high-pressure section (outlet 71 of the pump 7) communicate with each other. This increases the pressure in the back-pressure chamber R2. More specifically, brake fluid is directed from the outlet fluid line 16 pressurized by outlet pressure exerted by the pump 7, through the fourth fluid line 14 to the third fluid line 13. The back-pressure chamber R2, communicating with the third fluid line 13, increases in pressure. This brings about the same effect as that of the first embodiment. Further, the fluid line extending from the pump 7 to the back-pressure chamber R2 is shorter in distance and simpler in structure than it would be if the fourth fluid line 14 were connected, not to the outlet fluid line 16, but, for example to the first fluid line 11P. Shortening the fluid line extending from the pump 7 to the back-pressure chamber R2 makes it possible to transmit brake fluid from the pump 7 to the back-pressure chamber R2 more quickly. This in turn leads to an improved response for a pressure increase in the back-pressure chamber R2, and thus improved controllability of pedal stroke. Structural features similar to those of the first embodiment bring about effects similar to those of the first embodiment.

[Effects]

The apparatus 1 of the second embodiment brings about the following effect:

(4) The fourth fluid line 14 is connected to the fluid line (outlet fluid line 16) on the outlet side of the pump 7, instead of to the line connecting the cut valve 21P of the first fluid line 11P and the wheel cylinders 8.

This shortens and simplifies the fluid line extending from the pump 7 to the back-pressure chamber R2.

Embodiment 3

Figure 4:
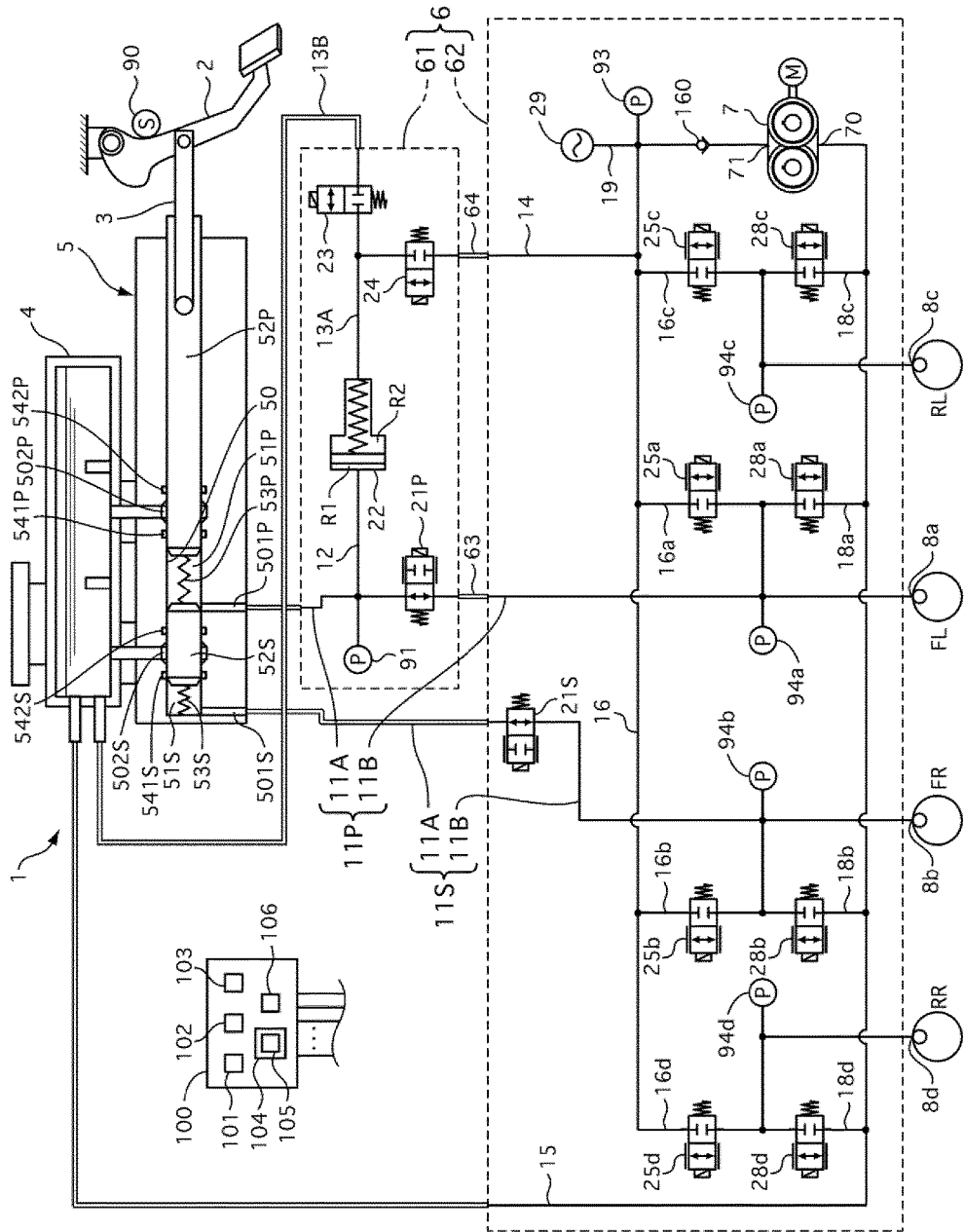
FIG. 4 is a schematic view of a brake control apparatus according to a third embodiment.

FIG. 4 schematically shows the brake control apparatus 1 according to the third embodiment. To generate braking force in the wheels FL to RR under hydraulic control, the first and second embodiments directly sends an output from the pump 7 to the wheel cylinders 8. In contrast, the third embodiment stores pressurized brake fluid in an accumulator 29 in advance and adjusts an amount of fluid required for the wheel cylinders 8 under control performed by the SOL/V IN 25 and SOL/V OUT 28. In other words, the apparatus 1 of this embodiment has a second unit 62 that is structurally different from that of the second embodiment.

The first fluid cylinder 11 connects the master cylinder 5 and the wheel cylinders 8a and 8b on the front wheels Fl and FR. The outlet fluid line 16 connects the outlet 71 of the pump 7 and the wheel cylinders 8a to 8d. The outlet fluid lines 16a and 16b on the front wheels FL and FR are connected to the first fluid line 11 (fluid line 11B), through which the outlet fluid lines 16a and 16b are connected to the wheel cylinders 8a and 8b on the front wheels FL and FR. Between the check valve 160 of the outlet fluid line 16 and the wheel cylinders 8 are disposed the SOL/V IN 25 (in fluid lines 16a to 16c) for the respective wheels FL to RR. The SOL/V IN 25 are normally closed electromagnetic valves. The accumulator 29 is connected via a fluid line 19 to the line between the check valve 160 on the outlet line 16 and the SOL/V IN 25. The fourth fluid line 14 branches off from the line between the check valve 160 on the output fluid line 16 and the SOL/V IN 25 and connects to the line (fluid line 13A) of the third fluid line 13 between the stroke-simulator OUT valve 23 and the back-pressure chamber R2.

The second pressure-reducing fluid line 18 connects a portion of the outlet fluid line 16 on the wheel cylinder 8 side of the SOL/V IN 25, to the inlet fluid line 15. The second pressure-reducing fluid line 18 is provided with the SOL/V OUT 28 for the respective wheels FL to RR. The SOL/V OUT 28 are normally closed proportional control valves. This embodiment does not use the pressure-regulating valves 27 (first pressure-reducing fluid lines 17), the communication valves 26, or the check valves 250, as in the first and second embodiments. Between the check valve 160 on the outlet fluid line 16 and the SOL/V IN 25 is provided a hydraulic pressure sensor 93 for sensing the hydraulic pressure (the hydraulic pressure of fluid stored in the accumulator 29 or pump outlet pressure) at the location of the hydraulic pressure sensor 93. Between each of the SOL/V IN 25 in the outlet fluid line 16 and the respective wheel cylinder 8 (or between the cut valve 21P on the first fluid line 11P and the wheel cylinders 8 on the front wheels FL and FR) is provided a hydraulic pressure sensor 94 for sensing the hydraulic pressure (wheel-cylinder hydraulic pressure) at the location of the hydraulic pressure sensor 94.

With at least the SOL/V IN 25 controlled to close, the wheel-cylinder hydraulic pressure controller 104 operates the pump 7 so as to transmit brake fluid from the reservoir tank 4 via the inlet fluid line 15, pump 7, outlet fluid line 16, and fluid line 19 to the accumulator 29 and thereby store desired hydraulic pressure in the accumulator 29. The accumulator 29 is a hydraulic pressure source that uses brake fluid supplied from the reservoir tank 4 to generate hydraulic pressure in the outlet fluid line 16 and the first fluid line 11. The wheel-cylinder hydraulic pressure controller 104 controls the cut valve 21 to close and feedback-controls the opening (degree of opening or the like) of the SOL/V IN 25 and SOL/V OUT 28 to bring a value detected by the hydraulic pressure sensor 94 toward a target wheel-cylinder hydraulic pressure. This makes it possible to adjust the hydraulic pressure delivered from the accumulator 29 via the outlet fluid line 16 and the first fluid line 11 to each wheel cylinder 8 and apply desired braking force to each of the wheels FL to RR. The antilock controller 105 controls the cut valve 21 to close and also controls the opening of the SOL/V IN 25 and SOL/V OUT 28, as described above. In this way, the antilock controller 105 increases or decreases the hydraulic pressure in the cylinder 8 on any wheel slipping unduly. Since other elements of the third embodiment are similar to those of the second embodiment, their description is omitted by assigning the same reference numerals as those used in the second embodiment.

The stroke controller 106 establishes communication between the back-pressure chamber R2 and the high-pressure section (accumulator 29) by controlling the stroke-simulator IN valve 24 to open. This makes it possible to increase the pressure in the back-pressure chamber R2. More specifically, brake fluid is directed from the outlet fluid line 16 pressurized by accumulating pressure in the accumulator 29, via the fourth fluid line 14 to the third fluid line 13. In this way, the back-pressure chamber R2, in communication with the third fluid line 13, increases in pressure. This brings about the same effect as that of the first embodiment.

Structural features of the apparatus 1 of this embodiment similar to those of the first and second embodiments bring about effects similar to those of the first and second embodiments.

Other Embodiments

Although a number of embodiments of the present invention have been described above by way of example, the present invention is not limited to the specific embodiments described above, but includes design modifications, etc., that do not depart from the scope of the present invention.

For example, the brake control apparatus (hydraulic control unit) of the present invention involving stroke control is sufficient as long as it is capable of performing antilock control, with communication between master cylinder and wheel cylinder cut off, and is not limited to the above embodiments.

The brake pedal and the master cylinder can be provided therebetween with a booster that is capable of transmitting drive force mechanically, such as a link-type booster.

The method of actuating various actuators for controlling wheel-cylinder hydraulic: pressure described above is not limited to the above embodiments and can be modified, as required.

Various valves, pumps, motors, a stroke simulator, or other elements included in the hydraulic control unit may be included in either the first unit or the second unit.

The hydraulic control unit can be of integral type combining the first and second units or of multiunit type with the first or second unit divided into subunits. The hydraulic pressure source is not limited to a gear pump or an accumulator and may be of other types, for example, a plunger pump, or an electrically powered piston cylinder.

The above embodiments use hydraulic wheel cylinders on the wheels, but are not limited to such wheel cylinders and may be provided with hydraulic wheel cylinders on the front wheels and calipers on the rear wheels, the calipers using electric motors to generate braking force.

The present invention may be embodied as follows:
(1) The brake control apparatus may comprise:
a first fluid line connecting a master cylinder, which generates hydraulic pressure by a stroke of a piston in response to a driver's braking operation, to a wheel cylinder on a wheel;
a hydraulic pressure source for generating hydraulic pressure in the first fluid line with brake fluid supplied from a reservoir tank;
a cut valve on the first fluid line between the hydraulic pressure source and the master cylinder;
a stroke simulator for generating reaction force in response to the driver's braking operation, the stroke simulator comprising two chambers separated by a partition wall;
a second fluid line connecting one of the two chambers of the stroke simulator to a portion between the cut valve on the first fluid line and the master cylinder;
a third fluid line connecting another chamber of the stroke simulator to a low-pressure section;
a stroke-simulator OUT valve on the third fluid line;
a fourth fluid line connecting a portion between the stroke-simulator OUT valve on the third fluid line and said another chamber to a portion between the cut valve on the first fluid line and the wheel cylinder;
a stroke-simulator IN valve on the fourth fluid line; and
an antilock controller for detecting any slip of the wheel and increasing and decreasing hydraulic pressure in the wheel cylinder, wherein
at least during operation of the antilock controller, each of the valves is actuated to impart a stroke to the piston with hydraulic pressure generated by the hydraulic pressure source.
(2) The brake control apparatus according to (1) may comprise a hydraulic pressure controller that actuates the cut valve to close and uses the hydraulic pressure source to increase wheel-cylinder hydraulic pressure, wherein when the antilock controller has started antilock control during control by the hydraulic pressure controller, each of the valves is actuated to impart a stroke to the piston with hydraulic pressure generated by the hydraulic pressure source.
(3) The brake control apparatus according to (2) may comprise a solenoid IN valve on the first fluid line between the cut valve and the wheel cylinder, wherein the forth fluid line is connected to a portion between the cut valve on the first fluid line and the solenoid IN valve.
(4) The brake control apparatus according to (1) may be so configured that the partition wall moves to impart a stroke to the piston.
(5) The brake control apparatus according to (4) may be so configured that when it is determined that the driver's brake operation is in progress and the antilock controller is not in operation, the stroke-simulator OUT valve is actuated to open and the stroke-simulator IN valve is actuated to close.
(6) The brake control apparatus according to (4) may be so configured that when it is determined that the driver's brake operation is in progress and the antilock controller operates to reduce wheel-cylinder hydraulic pressure, the stroke-simulator OUT valve is actuated to close and the stroke-simulator IN valve is actuated to open.
(7) The brake control apparatus according to (4) may be so configured that when it is determined that the driver's brake operation is in progress and the antilock controller operates to increase wheel-cylinder hydraulic pressure, the stroke-simulator OUT valve is actuated to open and the stroke-simulator IN valve is actuated to close.
(8) The brake control apparatus according to (4) may be so configured that when it is determined that the driver's brake operation is in progress and the antilock controller operates to hold wheel-cylinder hydraulic pressure, the stroke-simulator OUT valve and the stroke-simulator IN valve are actuated to close.
(9) The brake control apparatus according to (1) may be so configured that the fourth fluid line is connected to a fluid line on an outlet side of the hydraulic pressure source, instead of a portion between the cut valve of the first fluid line and the wheel cylinder.

(10) The brake control apparatus according to (1) may comprise:
  a brake operating condition detector for determining whether the driver's brake operation is in progress; and
  a hydraulic pressure controller for controlling the cut valve to close and increasing wheel-cylinder hydraulic pressure with the hydraulic pressure source, wherein
  when the brake operating condition detector has detected the absence of brake operation, the stroke-simulator OUT valve and the stroke-simulator IN valve are actuated to close.

(11) The brake control apparatus may comprise:
  a first fluid line connecting a master cylinder, which generates hydraulic pressure by a stroke of a piston in response to a driver's braking operation, to a wheel cylinder on a wheel;
  a hydraulic pressure source for generating hydraulic pressure in the first fluid line with brake fluid supplied from a reservoir tank;
  a cut valve on the first fluid line between the hydraulic pressure source and the master cylinder;
  a stroke simulator for generating reaction force in response to the driver's braking operation, the stroke simulator comprising two chambers separated by a partition wall;
  a second fluid line connecting one of the two chambers of the stroke simulator to a portion between the cut valve on the first fluid line and the master cylinder;
  a third fluid line connecting another chamber of the stroke simulator to a low-pressure section;
  a stroke-simulator OUT valve on the third fluid line;
  a fourth fluid line connecting a portion between the stroke-simulator OUT valve on the third fluid line and said another chamber to a portion between the cut valve on the first fluid line and the wheel cylinder;
  a stroke-simulator IN valve on the fourth fluid line;
  a hydraulic pressure controller for actuating at least the cut valve to close and increasing wheel-cylinder hydraulic pressure with the hydraulic pressure source;
  an antilock controller for increasing and decreasing hydraulic pressure in the wheel cylinder when it has detected a lockup tendency; and
  a stroke controller for actuating the stroke-simulator IN valve and the stroke-simulator OUT valve, at least during operation of the antilock controller, so as to impart a stroke to the piston with hydraulic pressure generated by the hydraulic pressure source.

(12) The brake control apparatus according to (11) may comprise:
  a solenoid IN valve on the first fluid line between the cut valve and the wheel cylinder; wherein
  the fourth fluid line is connected to a portion between the cut valve on the first fluid line and the solenoid IN valve.

(13) The brake control apparatus according to (11) may be so configured that the fourth fluid line is connected to a fluid line on an outlet side of the hydraulic pressure source, instead of a portion between the cut valve on the first fluid line and the wheel cylinder.

(14) The brake control apparatus according to (13) may comprise:
  a brake operating condition detector for determining whether the driver's brake operation is in progress; and
  a hydraulic pressure controller for controlling the cut valve to close and increasing wheel-cylinder hydraulic pressure with the hydraulic pressure source, wherein
  when the brake operating condition detector has detected the absence of brake operation, the stroke-simulator OUT valve and the stroke-simulator IN valve are actuated to close.

(15) The brake control apparatus according to (13) may be so configured that when the brake operating condition detector has detected brake operation and the antilock controller is not in operation, the stroke-simulator OUT valve is actuated to open and the stroke-simulator IN valve is actuated to close.

(16) The brake control apparatus according to (13) may be so configured that when the brake operating condition detector has detected brake operation and the antilock controller operates to decrease wheel-cylinder hydraulic pressure, the stroke-simulator OUT valve is actuated to close and the stroke-simulator IN valve is actuated to open.

(17) The brake control apparatus according to (13) may be so configured that when the brake operating condition detector has detected brake operation and the antilock controller operates to increase wheel-cylinder hydraulic pressure, the stroke-simulator OUT valve is actuated to open and the stroke-simulator IN valve is actuated to close.

(18) The brake control apparatus according to (13) may be so configured that when the brake operating condition detector has detected brake operation and the antilock controller operates to hold wheel-cylinder hydraulic pressure, the stroke-simulator OUT valve and the stroke-simulator IN valve are actuated to close.

(19) The brake control apparatus according to (11) may be so configured that the partition wall moves to impart a stroke to the piston.

(20) A brake control method using a brake control apparatus may comprise:
  a stroke simulator for generating reaction force in response to a driver's brake operation by allowing brake fluid flowing from the master cylinder, which generates hydraulic pressure by a stroke of the piston in response to the driver's brake operation, to flow into one of two separate chambers in the stroke simulator;
  a stroke-simulator OUT valve on a fluid line between another chamber of the stroke simulator and a reservoir; and
  a stroke-simulator IN valve on a fluid line connecting a fluid line, located between said another chamber and the stroke-simulator OUT valve, to a hydraulic pressure source, wherein
  the stroke-simulator OUT valve and the stroke-simulator IN valve are actuated during antilock control, and hydraulic pressure generated by the hydraulic pressure source is used to control the position of the piston.

The present application claims priority to Japanese patent application No. 2013-191431 filed on Sep. 17, 2013. The whole content of the disclosure in Japanese patent application No. 2013-191431 filed on Sep. 17, 2013, including the specification, claims, drawings, and abstract, are incorporated by reference in the present application.

REFERENCE SIGNS LIST 1. brake control apparatus
4. reservoir tank
5. master cylinder
52. piston
7. pump (hydraulic pressure source)
8. wheel cylinder
11. first fluid line 12. second fluid line
13. third fluid line
14. fourth fluid line
16. outlet fluid line (fluid line on the outlet side of the hydraulic pressure source)
21. cut valve
22. stroke simulator
220. piston (partition wall)
23. stroke-simulator OUT valve
24. stroke-simulator IN valve
25. solenoid IN valve
104. hydraulic-pressure controller
105. antilock controller
FL to RR. wheels
R1. positive-pressure chamber
R2. back-pressure chamber

The invention claimed is:

1. A brake control apparatus comprising:
   a first fluid line configured to connect a master cylinder, which generates hydraulic pressure by a stroke of a piston in response to a driver's braking operation, to a wheel cylinder on a wheel;
   a hydraulic pressure source configured to generate hydraulic pressure in the first fluid line with brake fluid supplied from a reservoir tank;
   a cut valve provided on the first fluid line between the hydraulic pressure source and the master cylinder;
   a stroke simulator configured to generate reaction force in response to the driver's braking operation, the stroke simulator comprising two chambers separated by a partition wall;
   a second fluid line configured to connect one of the two chambers of the stroke simulator to a portion between the cut valve on the first fluid line and the master cylinder;
   a third fluid line configured to connect another chamber of the stroke simulator to a low-pressure section;
   a stroke-simulator OUT valve provided on the third fluid line;
   a fourth fluid line configured to connect a portion between the stroke-simulator OUT valve on the third fluid line and said another chamber to a portion between the cut valve on the first fluid line and the wheel cylinder;
   a stroke-simulator IN valve provided on the fourth fluid line; and
   an antilock controller configured to detect any slip of the wheel and increase and decrease hydraulic pressure in the wheel cylinder,
   wherein at least during operation of the antilock controller, each of the valves is actuated to impart a stroke to the piston with hydraulic pressure generated by the hydraulic pressure source.

2. A brake control apparatus according to claim 1, further comprising a hydraulic pressure controller that actuates the cut valve to close and uses the hydraulic pressure source to increase wheel-cylinder hydraulic pressure, wherein when the antilock controller starts antilock control during control by the hydraulic pressure controller, each of the valves is actuated to impart a stroke to the piston with hydraulic pressure generated by the hydraulic pressure source.

3. A brake control apparatus according to claim 2, further comprising a solenoid IN valve on the first fluid line between the cut valve and the wheel cylinder, wherein the forth fluid line is connected to a portion between the cut valve on the first fluid line and the solenoid IN valve.

4. A brake control apparatus according to claim 1, wherein the partition wall moves to impart a stroke to the piston.

5. A brake control apparatus according to claim 4, wherein when it is determined that the driver's brake operation is in progress and the antilock controller is not in operation, the stroke-simulator OUT valve is actuated to open and the stroke-simulator IN valve is actuated to close.

6. A brake control apparatus according to claim 4, wherein when it is determined that the driver's brake operation is in progress and the antilock controller operates to reduce wheel-cylinder hydraulic pressure, the stroke-simulator OUT valve is actuated to close and the stroke-simulator IN valve is actuated to open.

7. A brake control apparatus according to claim 4, wherein when it is determined that the driver's brake operation is in progress and the antilock controller operates to increase wheel-cylinder hydraulic pressure, the stroke-simulator OUT valve is actuated to open and the stroke-simulator IN valve is actuated to close.

8. A brake control apparatus according to claim 4, wherein when it is determined that the driver's brake operation is in progress and the antilock controller operates to hold wheel-cylinder hydraulic pressure, the stroke-simulator OUT valve and the stroke-simulator IN valve are actuated to close.

9. A brake control apparatus according to claim 1, wherein the fourth fluid line is connected to a fluid line on an outlet side of the hydraulic pressure source, instead of a portion between the cut valve of the first fluid line and the wheel cylinder.

10. A brake control apparatus according to claim 1 further comprising:
    a brake operating condition detector configured to determine whether the driver's brake operation is in progress; and
    a hydraulic pressure controller configured to control the cut valve to close and increase wheel-cylinder hydraulic pressure with the hydraulic pressure source, wherein when the brake operating condition detector detects the absence of brake operation, the stroke-simulator OUT valve and the stroke-simulator IN valve are actuated to close.

11. A brake control apparatus comprising:
    a first fluid line configured to connect a master cylinder, which generates hydraulic pressure by a stroke of a piston in response to a driver's braking operation, to a wheel cylinder on a wheel;
    a hydraulic pressure source configured to generate hydraulic pressure in the first fluid line with brake fluid supplied from a reservoir tank;
    a cut valve provided on the first fluid line between the hydraulic pressure source and the master cylinder;
    a stroke simulator configured to generate reaction force in response to the driver's braking operation, the stroke simulator comprising two chambers separated by a partition wall;
    a second fluid line configured to connect one of the two chambers of the stroke simulator to a portion between the cut valve on the first fluid line and the master cylinder;
    a third fluid line configured to connect another chamber of the stroke simulator to a low-pressure section;
    a stroke-simulator OUT valve provided on the third fluid line;
    a fourth fluid line configured to connect a portion between the stroke-simulator OUT valve on the third fluid line and said another chamber to a portion between the cut valve on the first fluid line and the wheel cylinder;
    a stroke-simulator IN valve provided on the fourth fluid line;

a hydraulic pressure controller configured to actuate at least the cut valve to close and increasing wheel-cylinder hydraulic pressure with the hydraulic pressure source;
an antilock controller configured to increase and decrease hydraulic pressure in the wheel cylinder when it detects a lock tendency of the wheel; and
a stroke controller configured to actuate the stroke-simulator IN valve and the stroke-simulator OUT valve, at least during operation of the antilock controller, so as to impart a stroke to the piston with hydraulic pressure generated by the hydraulic pressure source.

12. A brake control apparatus according to claim 11, further comprising:
a solenoid IN valve on the first fluid line between the cut valve and the wheel cylinder; wherein
the fourth fluid line is connected to a portion between the cut valve on the first fluid line and the solenoid IN valve.

13. A brake control apparatus according to claim 11, wherein the fourth fluid line is connected to a fluid line on an outlet side of the hydraulic pressure source, instead of a portion between the cut valve on the first fluid line and the wheel cylinder.

14. A brake control apparatus according to claim 13, further comprising:
a brake operating condition detector configured to determine whether the driver's brake operation is in progress; and
a hydraulic pressure controller configured to control the cut valve to close and increase wheel-cylinder hydraulic pressure with the hydraulic pressure source, wherein when the brake operating condition detector detects the absence of brake operation, the stroke-simulator OUT valve and the stroke-simulator IN valve are actuated to close.

15. A brake control apparatus according to claim 13, wherein when the brake operating condition detector detects brake operation and the antilock controller is not in operation, the stroke-simulator OUT valve is actuated to open and the stroke-simulator IN valve is actuated to close.

16. A brake control apparatus according to claim 13, wherein when the brake operating condition detector detects brake operation and the antilock controller operates to decrease wheel-cylinder hydraulic pressure, the stroke-simulator OUT valve is actuated to close and the stroke-simulator IN valve is actuated to open.

17. A brake control apparatus according to claim 13, wherein when the brake operating condition detector detects brake operation and the antilock controller operates to increase wheel-cylinder hydraulic pressure, the stroke-simulator OUT valve is actuated to open and the stroke-simulator IN valve is actuated to close.

18. A brake control apparatus according to claim 13, wherein when the brake operating condition detector detects brake operation and the antilock controller operates to hold wheel-cylinder hydraulic pressure, the stroke-simulator OUT valve and the stroke-simulator IN valve are actuated to close.

19. A brake control apparatus according to claim 11, wherein the partition wall moves to impart a stroke to the piston.

20. A brake control method using a brake control apparatus, comprising:
generating, by a stroke simulator, reaction force in response to a driver's brake operation by allowing brake fluid flowing from a master cylinder, which generates hydraulic pressure by a stroke of a piston in response to the driver's brake operation, to flow into one of two separate chambers in the stroke simulator;
providing a stroke-simulator OUT valve on a fluid line between another chamber of the stroke simulator and a reservoir; and
providing a stroke-simulator IN valve on a fluid line connecting a fluid line, located between said another chamber and the stroke-simulator OUT valve, to a hydraulic pressure source, and
actuating the stroke-simulator OUT valve and the stroke-simulator IN valve during antilock control, and controlling the position of the piston using hydraulic pressure generated by the hydraulic pressure source.

* * * * *